Feb. 14, 1928.

M. C. CRAWLEY 1,659,134

AUTOMATIC ELECTRIC WATER HEATER

Original Filed Feb. 26. 1924

INVENTOR
Mansfield C. Crawley.
BY
ATTORNEYS

Patented Feb. 14, 1928.

1,659,134

UNITED STATES PATENT OFFICE.

MANSFIELD C. CRAWLEY, OF GROTON, NEW YORK.

AUTOMATIC ELECTRIC WATER HEATER.

Application filed February 26, 1924, Serial No. 695,212. Renewed January 13, 1926.

This invention relates to that type of electric water heating apparatus designed to maintain a supply of water heated to a predetermined desired degree, the electric heating means being operative when the water is below the predetermined temperature and being inoperative when the water is heated above the predetermined temperature. Water heating apparatus of this type is adapted for many uses where a supply of hot water is desirable. The apparatus shown and described herein is especially designed for household use.

The main object of this invention is to provide an electric water heating apparatus wherein the flow of current between the terminals for heating the water will be automatically controlled through the variable density of the water. It is well known that as the temperature of water increases its density decreases; and the main object of this invention is to provide means whereby this variation in the density of water will be utilized to control the flow of electric current.

A further object of the invention is to provide a movable current interrupter which will be controlled, as to its position with respect to the electric terminals, by the density of the water, said movable interrupter automatically moving into place between the terminals to interrupt the flow of current when the density of the water has been reduced to the desired degree by the rise of the water temperature, said interrupter automatically moving away from its position between the electric terminals when the density of the water is increased sufficiently by the reduction of the water temperature.

A further object of the invention is to provide an automatically operating electric water heater which is purely hydrostatic in operation and which will not depend, in any manner, upon the operation of thermostatic devices.

Figure 1:
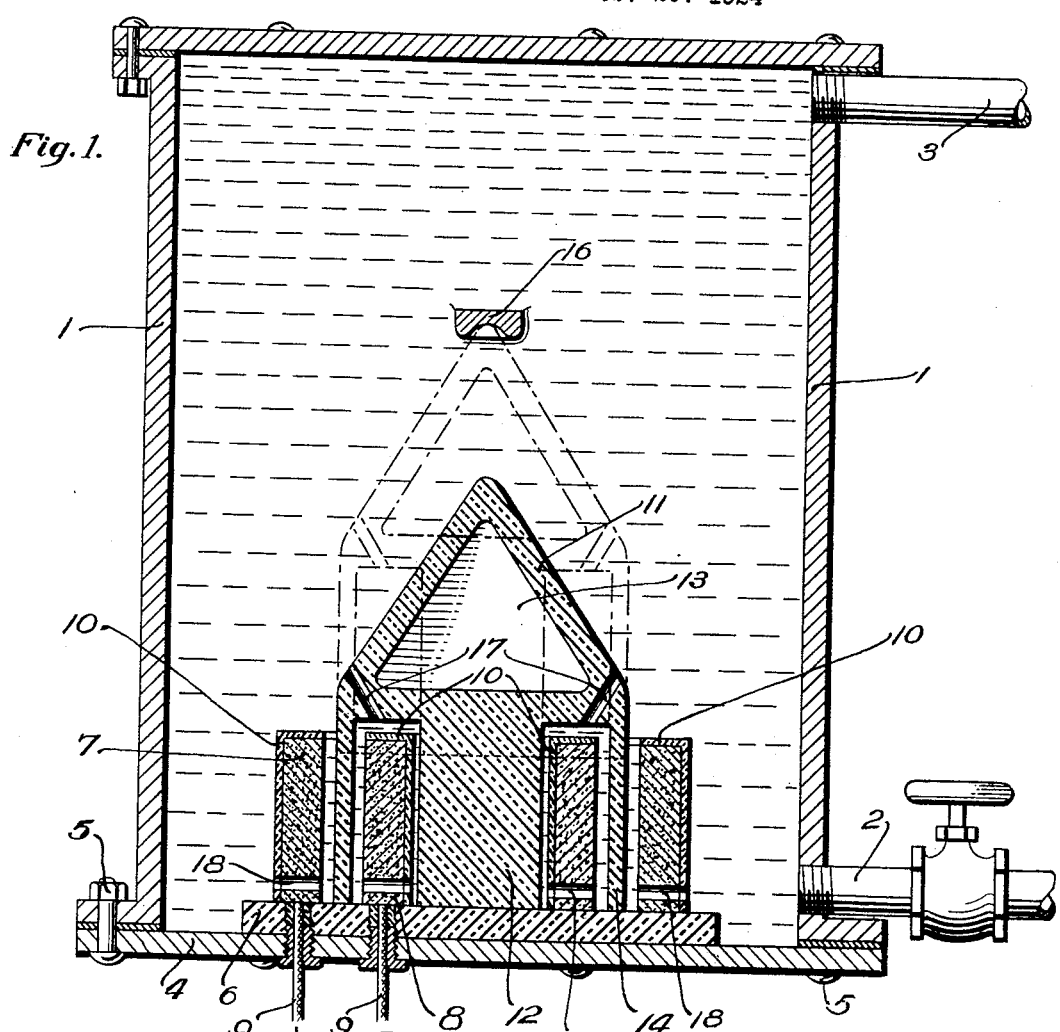
Figure 1 is a vertical sectional view of a tank showing the invention applied therein.
Figure 2:
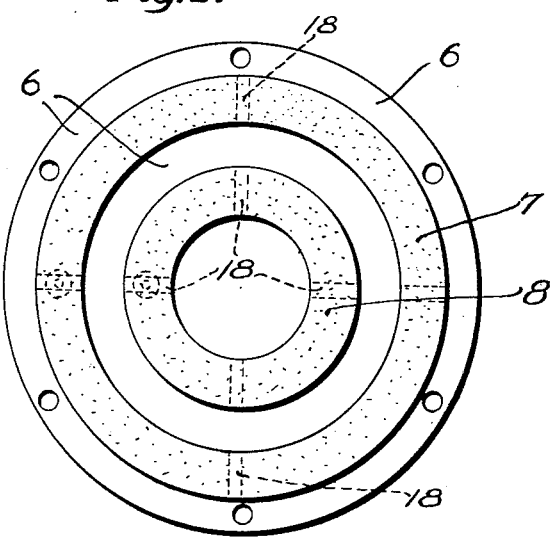
Fig. 2 is a plan view of the terminal plate to which the electric current is connected.
Figure 3:
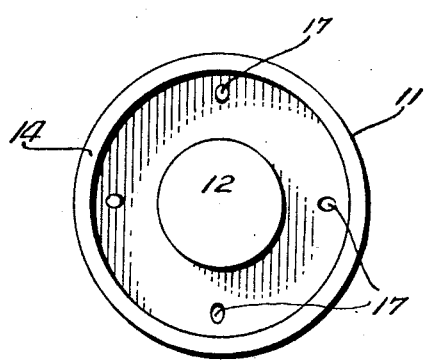
Fig. 3 a bottom plan view of the current interrupter.

Referring to the various parts by numerals, 1 designates a closed water tank of suitable capacity and provided with an inlet pipe 2 at its lower end and an outlet pipe 3 at its upper end. The bottom 4 of the tank is removably secured in place by means of bolts 5. Secured to the inner side of the bottom 4 of the tank is a plate 6 of suitable insulating material. Rigidly secured to this insulating plate is a tubular cylindrical carbon terminal 7, said cylinder being secured to the plate in an upright position and the wall thereof being of suitable height. Secured to the plate within and concentric with the terminal 7 is a smaller tubular cylindrical carbon terminal 8, said terminal 8 being secured to the plate in an upright position and being of the same height as the terminal 7. These two terminal plates 7 and 8 are rigidly secured in position on the plate 6 with a suitable space between them. To each terminal is connected a wire 9 by means of which the electric current is supplied to the terminals, the circuit being completed by the flow of current across the annular space between the terminals when the tank is charged with water. The carbon terminals are preferably coated, except on their opposed faces, with a suitable water proof insulating enamel 10. This insulating material may be applied to the carbon terminals in any suitable manner, by baking or otherwise. Within the tank is arranged a circuit interrupter 11 which is adapted to vertically reciprocate within the tank in response to variations in the density of the water due to variations in the temperature of the water. This interrupter consists of a central lower cylindrical solid body 12 which is adapted to fit down within the cylindrical terminal 8 and to move freely up and down therein. The central body 12 carries an upper hollow water-tight head 13 which is preferably tapered upwardly. The head 13 is larger in diameter than the body 12 and carries at its outer edge an annular depending interrupter flange 14 which is adapted to enter the space between the terminals 7 and 8, said flange forming an insulating barrier between the terminals. The interrupter flange 14 is of sufficient length to rest on the supporting plate 6 when the circuit interrupter 11 is in its lowermost position. The interrupter device is made of suitable insulating material, preferably glass, and the hollow head 13 is properly proportioned to secure the proper operation of the interrupter as will be more fully hereinafter described. To limit the upward movement of the interrupter a stop 16 is secured within the tank directly over the apex of the cone-shape head 13, said stop being so located that the body 12 and the flange 14 will not entirely be withdrawn from the terminals, as indicated in dotted lines in Fig. 1. The interrupter is provided with passages 17 which enter the upper end of the annular channel between the flange 14 and the head 12 in order to ensure a free circulation of water into and out of the said channel during the vertical up and down movement of the interrupter. The terminals 7 and 8 are provided with perforations 18 to permit free circulation of the water.

The water-tight chamber within the head 13 of the interrupter is so proportioned that the specific gravity of the interrupter device will be slightly less than the volume of water displaced by the interrupter when the temperature of the water is comparatively low, for instance 60°. The result of this is that when the temperature of the water decreases to 60° or thereabouts, the interrupter will rise until its apex engages the stop 16 as shown in dotted lines in Fig. 1. This will remove the interrupter flange 14 from between the terminals 7 and 8 and current will flow across the space between said terminals with the result that the water will be heated. As the temperature of the water in the tank increases its density decreases. The interrupter is so constructed that when the temperature of the water is raised to the desired degree, for instance 150°, the specific gravity of the interrupter will be greater than the volume of water displaced, with the result that the interrupter will drop to the bottom of the tank as shown in full lines in Fig. 1. This will interpose the interrupter flange between the terminals 7 and 8 and prevent the flow of current between said terminals. The interrupter will remain in its lower position until the temperature of the water in the tank has again dropped sufficiently to cause the interrupter to rise.

The operation of the interrupter is entirely automatic and depends wholly upon the variations in the density of water due to the variations in the temperature of the water.

The head 13 of the interrupter is preferably cone-shaped to facilitate its operation within the tank and to prevent, to a certain extent, the deposit of material on the sides of the head. The interrupter is wholly submerged in the tank at all times and is guided in its up and down movements by the terminals. It will, of course, be understood that additional guiding means may be provided if desired. The hollow head 13 forms a sealed chamber and is properly proportioned with respect to the weight of the interrupter as a whole in order to secure the desired operation.

What I claim is:

1. A liquid heating apparatus, comprising a tank, a pair of electric terminals secured therein and spaced apart, a current interrupter within the tank and adapted to move in one direction when the liquid within the tank is approximately at a predetermined density and adapted to move in the opposite direction when the density of the liquid within the tank has been changed approximately a predetermined degree, and means whereby the movement of the interrupter will permit the current to flow between the terminals or interrupt said flow depending upon the direction of movement of the interrupter.

2. A liquid heating apparatus, comprising a tank, a pair of terminals therein and spaced apart, and a current interrupter in the tank and operating in response to variations in the density of the liquid within the tank.

3. A liquid heating apparatus, comprising a tank, a pair of terminals therein and spaced apart, and a current interrupter within the tank and operating to interpose an insulating barrier between the electric terminals when the density of the liquid has been reduced to a predetermined degree, or substantially so, and operating to withdraw the barrier from between the terminals when the density of the liquid is increased to a predetermined degree, or substantially so.

4. A liquid heating apparatus, comprising a tank, a pair of terminals within the tank and spaced apart, a current interrupter within the tank and carrying an insulating barrier adapted to be interposed between the terminals, the said interrupter being adapted to rise in the liquid when the temperature of the liquid is reduced and its density increased to thereby remove the barrier from between the terminals and being also adapted to fall in the liquid when the density of the liquid has been sufficiently reduced by increasing its temperature and to thereby interpose the barrier between the terminals to interrupt the flow of current.

5. A water heating apparatus comprising a closed tank, means for supplying water thereto and withdrawing it therefrom, a pair of concentric tubular terminals fixed within the tank, a current interrupter mounted within the tank and provided with a depending annular barrier flange adapted to be interposed between the terminals, said interrupter being adapted to rise and fall in response to variations in the density of the water due to variations in the temperature of the water.

6. A water heating apparatus, comprising a closed tank, means for supplying water thereto and withdrawing it therefrom, a pair of terminals rigidly fixed within the tank and spaced apart, and a hydrostatic current interrupter mounted within the tank and adapted to control the flow of current between the terminals.

7. A water heating apparatus, comprising a tank, a pair of terminals therein, and a hydrostatic current interrupter mounted within the tank and controlling the flow of current between the terminals.

8. A liquid heating apparatus, comprising a tank, a pair of terminals therein, and a current interrupter in the tank operating in response to variations in the density of the liquid contained in the tank.

9. A liquid heating apparatus comprising a tank, a pair of terminals therein, a sealed float in the tank, an insulating barrier carried by the float and adapted to be interposed between the terminals, the float and the barrier being of such weight that they are adapted to rise in the liquid when the temperature of the liquid is reduced and its density increased to thereby remove the barrier from between the terminals, the float and the barrier being also adapted to fall in the liquid when the density of the liquid has been sufficiently reduced by increasing its temperature to thereby interpose the barrier between the terminals to interrupt the flow of current.

10. A liquid heating apparatus comprising a tank, a pair of terminals therein, a sealed float in the tank, an insulating barrier carried by the float and adapted to be interposed between the terminals, the float and the barrier being of such weight that they are adapted to rise in the liquid when the temperature of the liquid is reduced and its density increased to thereby remove the barrier from between the terminals, the float and the barrier being also adapted to fall in the liquid when the density of the liquid has been sufficiently reduced by increasing its temperature to thereby interpose the barrier between the terminals to interrupt the flow of current, and a stop to limit the rise of the float in the tank.

11. A liquid heating apparatus comprising a tank, a pair of terminals therein, a sealed float in the tank and formed with an upwardly tapered upper portion, an insulating barrier carried by the float and extending below the tapered portion and adapted to be interposed between the terminals, the float and the barrier being of such weight that they are adapted to rise in the liquid when the temperature of the liquid is reduced and its density increased to thereby remove the barrier from between the terminals, the float and the barrier being also adapted to fall in the liquid when the density of the liquid has been sufficently reduced by increasing its temperature to thereby interpose the barrier between the terminals to interrupt the flow of current.

12. A water heating apparatus comprising a tank, a pair of terminals therein and spaced apart to permit a normal flow of current between them when immersed in water, a current interrupter in the tank and provided with an insulating barrier adapted to be interposed between the terminals and operating when immersed in water to move said barrier in response to variations in the density of the water due to variations in the temperature of the water.

13. A liquid heating apparatus comprising a tank, a pair of tubular concentric terminals therein, a sealed float in the tank, an annular insulating barrier carried by the float and adapted to be interposed between the terminals, a central depending portion carried by the float and adapted to pass down into the central tubular terminal, the float and the barrier being of such weight that they are adapted to rise in the liquid when the temperature of the liquid is reduced and its density increased to thereby remove the barrier from between the terminals, the float and the barrier being also adapted to fall in the liquid when the density of the liquid has been sufficiently reduced by increasing its temperature to thereby interpose the barrier between the terminals to interrupt the flow of current.

In testimony whereof I hereunto affix my signature.

MANSFIELD C. CRAWLEY.